United States Patent [19]

Swisher

[11] Patent Number: 4,760,974
[45] Date of Patent: Aug. 2, 1988

[54] FISHING REEL WITH FLIPPING CONTROL
[75] Inventor: Steven L. Swisher, Tulsa, Okla.
[73] Assignee: Brunswick Corporation, Skokie, Ill.
[21] Appl. No.: 891,239
[22] Filed: Jul. 29, 1986
[51] Int. Cl.$^4$ .............................................. A01K 89/01
[52] U.S. Cl. .......................... 242/84.2 A; 242/84.21 A
[58] Field of Search ................... 242/84.2 A, 84.21 A, 242/84.2 R

[56] References Cited

U.S. PATENT DOCUMENTS

| | | | |
|---|---|---|---|
| 3,097,813 | 7/1963 | Golec | 242/84.2 A |
| 3,123,318 | 3/1964 | Wood | 242/84.2 A |
| 3,703,262 | 11/1972 | Menne | 242/84.2 A |
| 4,156,510 | 5/1979 | Hull | 242/84.2 A |
| 4,451,012 | 5/1984 | Puryear et al. | 242/84.2 A |

Primary Examiner—Stuart S. Levy
Assistant Examiner—Joseph J. Hail, III
Attorney, Agent, or Firm—Wood, Dalton, Phillips, Mason & Rowe

[57] ABSTRACT

An improved fishing reel is provided with a flipping casting mode by mechanism operatively associated with the rotatable spinner head of the reel. A finger trigger is pivotally mounted on the housing of the reel and is operatively associated with the spinner head for effecting axial movement of the spinner head between a rearward retrieval position and a forward casting position. A stop member is selectively movable into the path of movement of the finger trigger for either allowing full axial movement of the spinner head between the retrieval and casting positions or for selectively limiting forward movement of the spinner head at an intermediate position short of the full casting position. In an alternate form, the stop member is fixed to limit forward movement of the spinner head.

12 Claims, 2 Drawing Sheets

FISHING REEL WITH FLIPPING CONTROL

FIELD OF THE INVENTION

This invention generally relates to spinning style fishing reels and, more particularly, to a control for positioning the spinner head of the reel to allow for easy flipping-type casting.

BACKGROUND OF THE INVENTION

Closed face spinning reels, commonly termed spin cast fishing reels, include a line spool from which fishing line is paid out and retrieved by an appropriate pickup. The pickup is rotated by a crank machanism geared thereto, and a drag brake mechanism is provided to permit a pay out of line when pressure is exerted thereon by a hooked fish. A closed face housing completely envelopes the reel mechanism, and a thumb button is provided for preparing the internal mechanism for casting.

Conventional spin cast fishing reels of the character described above include a rotatable spinner head retained within the housing, normally on an axially movable center shaft. When the reel is placed in condition for casting, the spinner head is moved forwardly relative to the spool and the line is free to pay out. The spinner head may be moved completely forward until a snubber member on the front face thereof wedges the line between the spinner head and the inside surface of the closed face of the housing to "snub-off" the line. A spinner head pawl may be provided to hold the spinner head in this extreme forward position. When the crank handle is turned, the spinner head pawl will release and trip the spinner head assembly for movement back to its rearward retrieve position whereat radial pins or scalloped edges of the spinner head wind the line back onto the spool.

Such conventional spin cast reels are difficult to use for flipping type casting which is performed by flipping the casting rod, sometimes almost underhanded, in order to flip the lure toward its desired location. It is extremely difficult to perform this type of casting consistently without backlash. Part of the problem is that the line is not tensioned when the spinner head moves toward its forward limit position and the coils of line tend to expand. Since it is required to rotate the crank handle to either release the spinner head pawl or to actuate the line pickup mechanism, instantaneous line retrieval is impossible to prevent the coils of line from expanding, resulting in backlashes.

This invention is directed to providing an improved fishing reel of the character described which substantially eliminates backlash by giving the user of the reel instant retrieve when a finger trigger for moving the spinner head is released. The invention also contemplates incorporating this feature in a conventional fishing reel to allow the user the option of using the reel in a flipping mode or in a conventional casting mode.

SUMMARY OF THE INVENTION

An object, therefore, of the invention is to provide a new and improved spinning style fishing reel with the capability of being used for flipping-type casting.

The invention is illustrated herein in a fishing reel having a housing with a closed face defined by a front cover. A rotatable spinner head is retained within the housing and is displaceable axially between a rearward retrieval position and a forward casting position. A finger trigger is pivotally mounted on the housing and is operatively associated with the spinner head for effecting axial movement of the spinner head from the retrieval to the casting positions. Selectively operable stop means are provided for allowing full axial movement of the spinner head between the retrieval and casting positions, and for selectively limiting forward movement of the spinner head at an intermediate position between the retrieval and casting positions.

More particularly, the finger trigger is pivotally mounted on the housing, with a finger portion exposed on the outside of the housing and a spinner head moving portion on the inside of the housing. The stop means is located in the path of movement of the inside portion of the finger trigger.

In one embodiment of the invention, the stop means comprises a pin located in the path of movement of the finger trigger. In another embodiment of the invention, the stop means comprises a selectively rotatable member having a circumferential portion for engaging and limiting movement of the finger trigger and a cutout portion for allowing full movement of the finger trigger between the retrieval and casting positions.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
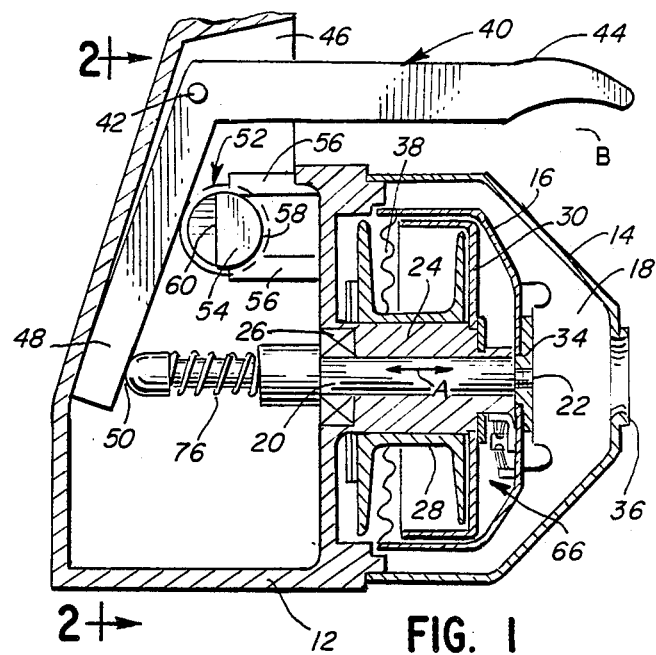
FIG. 1 is a vertical, central section through one embodiment of a fishing reel incorporating the concepts of the invention, with the spinner head in line retrieval position.

Referring to the drawings in greater detail, and first to FIG. 1, a spin cast fishing reel is generally designated 10 and includes a housing 12 with a closed face defined by a front cover 14. A spinner head 16 is rotatably mounted within a housing compartment 18, fixed to the front distal end of a center shaft 20, as by a bolt 22. Center shaft 20 is journalled in a forwardly projecting, generally cylindrical body portion 24 of housing 12, with bearing means 26 provided for the center shaft. The shaft is movable axially in the direction of arrow "A" for moving spinner head 16 between a rearward retrieval position, as shown in FIG. 1, and a forward casting position as described hereinafter.

Further conventional details of fishing reel 10 include a line spool 28 mounted on body portion 24, a spool drag washer and leveling lip member 30 positioned against the front flange of spool 28 by a retainer clip 32, and a snubber member 34 secured to the front face of spinner head 16 by bolt 22. Line is paid out from spool 28 through a front aperture 36 in front cover 14. Line is retrieved by rotating a crank handle which is geared to spinner head 16 for rotating the same, all of which are not shown in the drawings, being conventional components of such spin cast reels. The rear edge of spinner head 16 is scalloped, as at 38, to provide line pickup means when spinner head 16 is rotated by the crank handle. Of course, the invention is equally applicable for other line pickup mechanisms, such as the conventional radially extending and retractable pins.

Figure 2:
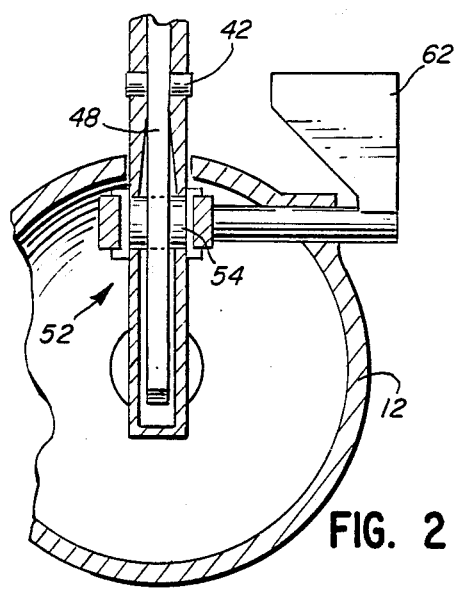
FIG. 2 is a fragmented section taken generally along the line 2—2 of FIG. 1.
Figure 3:
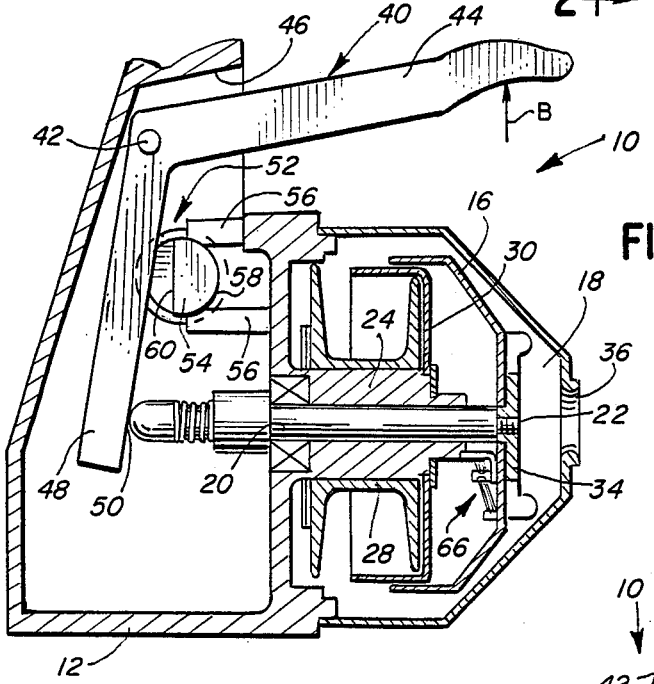
FIG. 3 is a view similar to that of FIG. 1, with the spinner head in conventional casting position.
Figure 4:
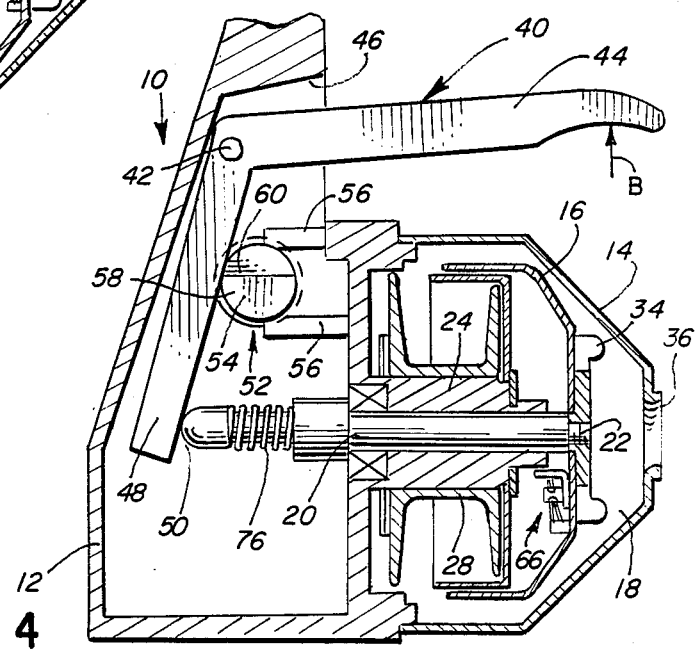
FIG. 4 is a view similar to that of FIGS. 1 and 3, with the spinner head in its intermediate or flipping casting position.

In the embodiment of FIGS. 1–5A, the invention is embodied in a system which allows for full axial movement of the spinner head 16 between its rearward retrieval position as shown in FIG. 1 and its forward casting position as shown in FIG. 3 and described hereinafter, and for selectively limiting forward movement of the spinner head to an intermediate position between the forward casting and rearward retrieval positions as shown in FIG. 4 and described hereinafter.

More particularly, referring conjointly to FIGS. 1 and 2, a finger trigger, generally designated 40, is pivotally mounted inside housing 12 on a pivot pin 42. The finger trigger includes a finger portion 44 exposed exteriorly of the housing, through an opening 46, and a spinner head moving portion 48 on the inside of housing 12. Finger trigger portion 48 is effective to engage the rear distal end of center shaft 20, as at 50, for driving the shaft and spinner head 16 forwardly in response to applying finger pressure to finger trigger portion 44 in the direction of arrow "B".

Selectively operable stop means are provided for allowing full axial movement of the spinner head between its retrieval position (FIG. 1) and its casting position (FIG. 3), and for selectively limiting forward movement of the spinner head to an intermediate position (FIG. 4) to afford easy casting in a flipping mode and to provide for immediate line retrieval.

More particularly, stop means, generally designated 52, includes a rotatable member 54 journalled on frame supports 56 within housing 12 and in the path of movement of finger trigger portion 48. Rotatable member 54 has a generally circular circumferential portion 58 and a cutout portion 60 as seen best in FIG. 1. FIG. 2 shows that a handle 62 is connected to rotatable member 54 through an opening 64 in housing 12. The rotatable member is shown in FIG. 1 with cutout portion 60 facing finger trigger portion 48. In this position, the path of movement of the finger trigger is uninhibited and can be operated to move the spinner head between its retrieval position as shown in FIG. 1 and its full casting position as shown in FIG. 3.

It should be noted that in the position of FIG. 3, finger trigger portion 48 has not fully engaged cutout portion 60 of rotatable stop member 54. Further movement of the finger trigger causes snubber member 34 to wedge the paid out line against the inside surface of front cover 14 to snub-off the line at the end of a cast. Therefore, selectively operable stop means 52 allows for full conventional operation of fishing reel 10.

Figure 5A:
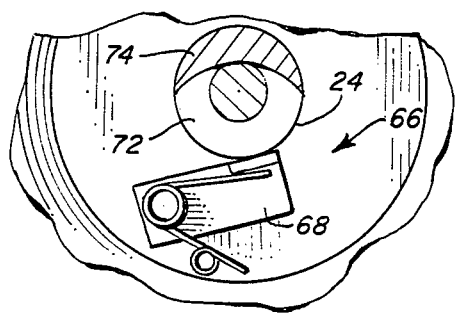
FIGS. 5A–5C are respective positions of the spinner head pawl corresponding to the positions of the spinner head in FIGS. 1, 3 and 4.
Figure 5B:
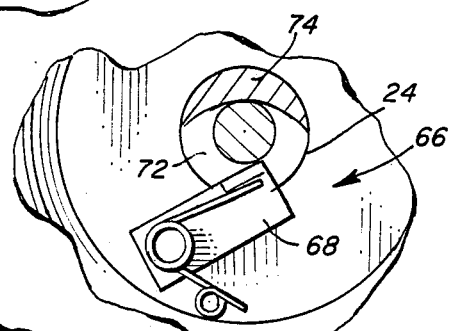
Figure 5C:
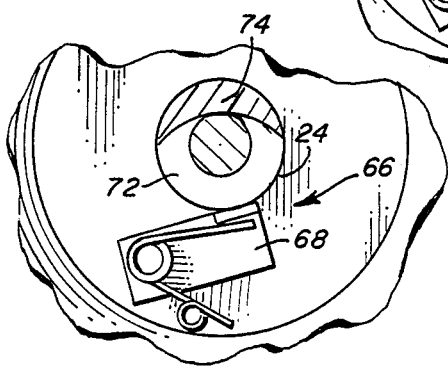

The reel also includes a pawl device, generally designated 66, for holding the spinner head in its forward casting position as shown in FIG. 3. The pawl device is substantially conventional, and its respective positions are shown in FIGS. 5A, 5B and 5C corresponding to the positions of the spinner head in FIGS. 1, 3 and 4, respectively. In the casting position of FIGS. 3 and 5B, a pawl member 68 is biased by a spring 70 over the front end of body portion 24 to lock the spinner head in its forward casting position. It can be seen in FIG. 5A that pawl member 68 simply abuts against the side of body 24 and can move axially in relation thereto. However, as spinner head 16 is moved to its casting position, the pawl member moves therewith and is spring biased into a small cutout 72, as seen in FIG. 5B, which locks the spinner head in the casting position. When the crank handle of the reel is turned to rotate the spinner head, pawl member 68 rides against a cam portion 74 (FIG. 5B). The cam moves the pawl member against the biasing of spring 70 back to a position outside the bounds of the body whereupon a coil spring 76 (FIGS. 1 and 3) automatically moves the spinner head back to the retrieval position.

It should be understood that up to this point, the above description of the operation of reel 10 is substantially conventional. Finger trigger 40 has been used similarly to the thumb button of a conventional spin cast reel. Since the spinner head does not return immediately or automatically back from the casting position to the retrieval position, it can be seen how the nontensioned fishing line and the expansion of the line coils on the spool are prone to cause backlash problems should a flipping-type casting action be employed to cast a fishing lure. During a normal casting action, the fishing rod is moved in a generally overhead motion and the lure can even be stopped before it hits the water to thereby prevent any backlash. This is extremely difficult for a "flipping" cast except for possibly the most skilled user.

However, as seen in FIG. 4, by rotating stop means 52 so that circumferential portion 58 of rotatable member 54 is in the path of finger trigger portion 48, the forward movement of spinner head 16 is stopped short of reaching the full casting and/or line snubbing position. Upon release of trigger finger 40, coil spring 76 instantaneously and immediately returns the spinner head and finger trigger back to the retrieval position. This completely obviates the necessity for rotating the crank handle of the reel in order to return the spinner head to the retrieval position. Line coil expansion and backlash problems are practically eliminated and even the most unskilled user can make effective flipping casts without backlash.

Figure 6:
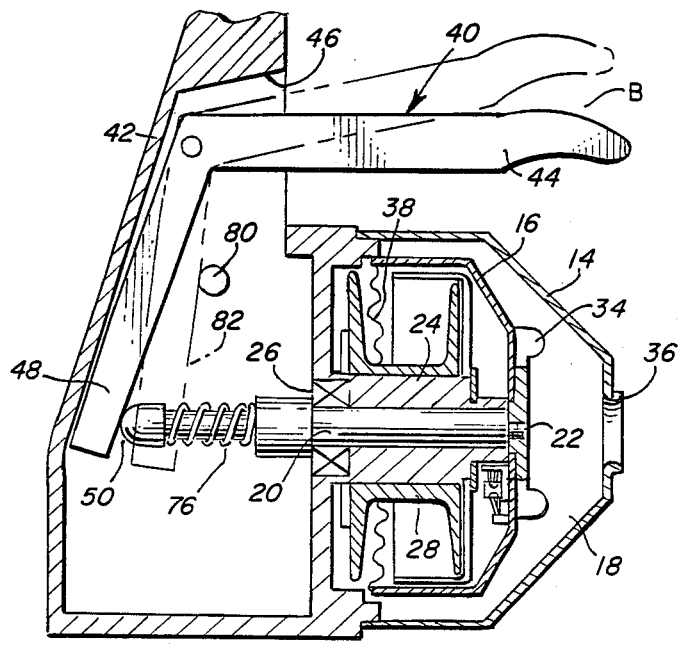
FIG. 6 is a view similar to that of FIG. 1, illustrating an alternate form of the invention.

FIG. 6 shows an alternate form of the invention which can be considered a "pure" flipping-type casting reel. Like numerals have been applied to those elements corresponding to like elements in FIGS. 1–4. In this embodiment, the selectively operable stop means 52 of the embodiment of FIGS. 1–4 has been replaced by a permanent stop means in the form of a fixed pin 80 projecting inwardly from housing 12 into the path of movement of trigger finger portion 48. It can be seen by dotted lines 82 that the trigger finger is stopped short of moving spinner head 16 to a full casting position. Again, the spinner head is returned instantaneously and immediately to the retrieval position by coil spring 76 upon release of the trigger finger.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a fishing reel having a housing with a closed face defined by a front cover, a rotatable spinner head retained within the housing and being displaceable axially between a rearward retrieval position and a forward casting position, the improvement comprising:
   a finger trigger;
   means pivotally mounting the finger trigger on the housing such that the finger trigger is operatively associated with the spinner head for effecting axial movement of the spinner head between said positions; and
   selectively operable stop means for allowing full axial movement of the spinner head between said positions and for selectively limiting forward movement of the spinner head at an intermediate position between said forward casting and rearward retrieval positions.

2. The fishing reel of claim 1 wherein said stop means is located in the path of movement of the finger trigger.

3. The fishing reel of claim 2 wherein said stop means comprises a selectively rotatable member having a circumferential portion for engaging and limiting movement of the finger trigger and a cutout portion for allowing full movement between said positions.

4. The fishing reel of claim 3, wherein said finger trigger is mounted on the housing with a finger portion exposed on the outside of the housing and a spinner head moving portion on the inside of the housing, the stop means being engageable with the inside portion of the finger trigger.

5. The fishing reel of claim 4 wherein the spinner head is moved by a center shaft of the reel, said finger trigger being pivotable about an axis generally transverse of said shaft, and said stop means being rotatable by means allowing rotation about an axis generally transverse to the shaft.

6. In a fishing reel having a housing with a closed face defined by a front cover, a rotatable spinner head retained within the housing and being displaceable axially between a rearward retrieval position and a forward casting position, the improvement comprising:
   a finger trigger;
   means movably mounting the finger trigger on the housing such that the finger trigger is operatively associated with the spinner head for effecting said axial movement thereof; and
   stop means restricting movement of the spinner head at an intermediate position between said forward casting and rearward retrieval positions.

7. The fishing reel of claim 6 wherein said stop means is located in the path of movement of the finger trigger.

8. The fishing reel of claim 7 wherein said stop means comprises a selectively movable member for selectively engaging and limiting movement of the finger trigger and for allowing unrestricted movement of the finger trigger.

9. The fishing reel of claim 7 wherein said stop means comprises a pin fixed to the inside of the housing and located in the path of movement of the trigger finger.

10. In a fishing reel having a housing with a closed face defined by a front cover, a rotatable spinner head retained within the housing and being displaceable axially for effecting casting and line retrieval, the improvement comprising:
    a finger trigger;
    means movably mounting the finger trigger on the housing such that the finger trigger is operatively associated with the spinner head for effecting said axial movement thereof; and
    stop means in the form of a selectively rotatable member located in the path of movement of the finger trigger and having a circumferential portion for engaging and limiting movement of the finger trigger restricting movement of the spinner head short of the front cover of the reel, and a cutout portion for allowing unrestricted movement of the finger trigger.

11. The fishing reel of claim 10 wherein said finger trigger is pivotally mounted on the housing with a finger portion exposed on the outside of the housing and a spinner head moving portion on the inside of the housing, the stop means being engageable with the inside portion of the finger trigger.

12. The fishing reel of claim 10 wherein the spinner head is moved by a center shaft of the reel, said finger trigger being pivotable about an axis generally transverse of said shaft, and said stop means being rotatable by means allowing rotation about an axis generally transverse to the shaft.

* * * * *